United States Patent [19]

Kollarits

[11] Patent Number: 4,816,846
[45] Date of Patent: Mar. 28, 1989

[54] METHOD AND APPARATUS FOR DIRECT COLOR PRINTING

[75] Inventor: Richard V. Kollarits, Colts Neck, N.J.

[73] Assignee: American Telephone and Telegraph Company, AT&T Bell Laboratories, Murray Hill, N.J.

[21] Appl. No.: 134,324

[22] Filed: Dec. 17, 1987

[51] Int. Cl.$^4$ .............................................. G01D 15/00
[52] U.S. Cl. ...................................... 346/157; 346/154
[58] Field of Search ............... 346/153.1, 157, 160.1, 346/160, 154; 355/14 DD, 3 DD; 358/300, 302; 101/DIG. 13; 364/518, 519

[56] References Cited

U.S. PATENT DOCUMENTS 4,399,209  8/1983  346 ........................................ 160.1/
4,710,785 12/1987  Mills ................................. 346/153.1

OTHER PUBLICATIONS

*Electronic Imaging,* Oct. 1984, "Photocapsule Process for Hardcopy Output", Arthur S. Diamond, pp. 35-41.

Primary Examiner—Arthur G. Evans
Attorney, Agent, or Firm—Henry T. Brendzel

[57] ABSTRACT

A color printing system employing a large area pattern of controllable light sources, where the pattern includes rows that are aligned substantially with the movement of a print medium in relation to the light sources. All of the light sources in each row contribute to the exposure of each pixel in a corresponding row of the resulting color print. The large area pattern of light sources can be realized with a range of approaches, from the use of a plurality of light sources to the use of a single light source coupled with an appropriate light modulator. In one embodiment, a liquid crystal light modulator was employed for each of the three primary colors.

19 Claims, 6 Drawing Sheets

YELLOW　　CYAN　　MAGENTA

SCAN DIRECTION →

METHOD AND APPARATUS FOR DIRECT COLOR PRINTING

BACKGROUND OF THE INVENTION

This invention relates to color and monochrome electronic imaging, and more particularly to the generation of color and monochrome prints of images represented by electronic signals.

Color cathode ray tubes (CRTs) are by far the most ubiquitous display technology. They are used in applications ranging from home video displays to high resolution computer aided design. Presently, most analog video images have medium spatial resolution (typically 512 horizontal by 480 vertical pixels or less), however higher resolution displays are becoming more available, particularly in commercial environments. CRTs are also characterized by nearly continuous intensity, hue and saturation.

In order to take full advantage of the video display technology, a compatible printing technology is required to transport video images onto a hard-copy medium, such as color prints. Applications that could benefit from color pictures include everyday business memoranda, catalog sales, real estate sales, point of sale terminals, Videotex applications, law enforcement, electronic photography and home entertainment.

The currently available color hard-copy printers employ diverse technologies. Ink jet printing uses fast drying ink droplets (yellow, magenta, cyan and possibly black) are thrust onto paper, where they combine to form a color image. The major disadvantage of ink jet printing is the complex hardware, which is also expensive and prone to failure (clogging). Thermal transfer also uses two techniques: direct transfer and indirect transfer. In monochrome direct transfer thermal printing, a print head raises the temperature of a chemically impregnated paper to a "blush point", whereupon two chemicals in the paper combine to form the image. In indirect transfer, a print head liquifies or sublimes a wax-ink on a polymer substrate and transfers the ink onto paper. Simple thermal transfer printers only print 8 colors. Thermal sublimation printers have continuous tone capability. The major disadvantage of thermal transfer printing is the speed and registration difficulties with the three colors. Electrostatic color printing is like the familiar black-and-white printing that was originally introduced by Xerox. It differs only in that each of the three colors must be handled independently, with separate exposures, toners, fixers, etc. The main disadvantage of electrostatic color printing is the complexity, cost and registration requirements associated with the triple optical systems and the coupled hardware for "developing" the prints. High quality color printing is achieved via color photography by using a CRT and color separation filters. Conventional film processing techniques are very slow, while instant photography is convenient but suffers from high print cost, short film shelf life, and messy disposable components.

The two recent advances in light-sensitive recording materials may make it possible to construct video printers which come close to matching the image quality of standard photographic prints, while reducing print cost and processing complexity. The Mead Corporation (Dayton, Ohio) has developed a photosensitive "paper" which is based on microencapsulation and photopolymerization technology. The panchromatic version of the paper is capable of producing color continuous tone images when exposed to light in the visible light between 400 and 700 nm. This microencapsulation technology is described in U.S. Pat. 4,399,209, issued to Sanders et al. on Aug. 16, 1983, and in "Photocapsule Process for Hardcopy Output," *Electronic Imaging, pp.* 35-41, Oct. 1984. The photo-sensitive "paper", which has about 1/1000 the sensitivity of standard photographic film, is processed by placing the exposed microcapsule sheet against a receiver sheet and rupturing the microcapsules with pressure rollers. The pressure releases a dye precursor which forms an image of a receiving color print sheet by means of chemical reactions with an acid on the receiver sheet. Dye formation occurs by means of a chemical reaction with an acid on the receiver sheet within several seconds if the color print sheet is heated to about 100° C. This is a dry process with the only disposable material being the microcapsule sheet. The system uses only organic dyes and no silver, and thus the cost per print is expected to be low.

The 3M Company (St. Paul, Minn.) has developed a color version of their dry silver paper which has been used for many years in monochrome CRT video printing systems. The color dry silver paper is exposed at the visible wavelengths and has a sensitivity of about 1/100th that of standard instant color films. It is processed by heating the exposed paper to about 132° C. for about 10 seconds, and involves no disposables.

The key to success for these newly developed light sensitive recording materials, as well as for the more established recording materials, is a compact and fast printer capable of producing the high light levels required with spatial resolution and a color gamut that is compatible with color CRT displays. The printer should have a low initial cost, a low operating cost, and be inherently reliable. None of the known approaches satisfy all of these needs.

SUMMARY OF THE INVENTION

The above needs are satisfied with a projection mode or near contact mode printing system employing a large area pattern of exposure-producing elements, such as controllable light sources, where the pattern includes rows that are aligned substantially with the movement of a print medium in relation to the light sources. All of the light sources in each row contribute, as necessary, to the exposure of each pixel in a corresponding row of the resulting color print. The large area pattern of light sources can be realized with a range of approaches, from the use of a plurality of light sources to the use of a single light source coupled with an appropriate light modulator or even a CRT. In one embodiment, a liquid crystal light modulator was employed for the three primary colors.

DETAILED DESCRIPTION

Figure 1:
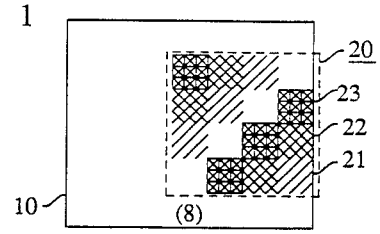
FIG. 1 depicts an example of a color print medium with a 16 pixel area exposed to different light intensities.

The principal shortcoming of printers employing a CRT exposure system lies in the fact that the exposing light source and the light modulator are the same device. This severely limits the available intensity and spectral range of the emitted light. Additionally, CRTs often display a poor geometrical stability of the raster, and are subject to variations with beam intensity and position, as well as component aging.

Exposure efficiency in CRT-based printers is also a problem. That is, whereas a conventional camera imparts the entire received image onto the film at once (in essence) and, in effect, stores all of the picture elements (pixels) in parallel, a CRT delivers the pixels in series. In a printer system with images having 512 lines and 480 pixels per line (approximately a quarter of a million pixels), the difference in operating modes may result in a substantial difference in exposure efficiency. Of course, this does not take into account the processing time but, nevertheless, CRT-based systems are invariably slower. This is especially true when it is considered that CRT systems have to deal with camera optics and low light levels from the CRT. The comparison does provide a measuring reference point which suggests that it is clearly desirable to employ as much parallelism as possible, and, accordingly, a parallel array of controllable light sources is preferable to a CRT source. Alas, a controllable light sources approach also has problems. First, in the absence of an optical reduction of the image, such light sources must be in very close proximity to each other. If a 5×5 inch print is to display 500 by 500 pixels, the light sources must be no more than 0.01 inches apart. Higher resolution requires smaller distances, and color processing requires very careful registration during the processing of the three primary colors. Second, in utilizing an array of light sources it is important to develop equal light intensities from each of the individual light sources in response to similar stimuli. This includes the need to compensate for failed, or out of spec, devices.

In accordance with the principles of my invention, the above problems are circumvented and the objectives achieved in a printer that employs an array of exposure-producing elements, such as controllable light luminaries, ink jet elements, and the like, in combination with an appropriate print medium and a relative movement between the two. In the context of this disclosure the exposure-producing elements are luminaries, where a luminary is an element that provides controllable light at its output port. Of course, it is the illumination function which exposes a print medium that is important. With the kinds of print media described above, that function is achieved with elements that deliver light. This light may originate at the element, or it may originate outside the element, with the element serving as a light modulator.

Thus, in the context of this disclosure the exposure-producing array has rows and columns of luminaries. The photosensitive print medium is moved relative to the array, in parallel to the array's rows, while the light luminaries are turned on and off digitally to provide the exposing light. The light providing array contains three segments of luminaries, and each segment is responsible for one of the primary colors. Each element in a row can contribute to the exposure of each pixel in a row of the exposed medium, as required to achieve the desired intensity. Consequently, a printer constructed in accordance with the principles of my invention has a number of advantages that other printers do not possess. For example, because a plurality of columns are used and the print medium traverses each and every column, where the potential contribution by each column is identical, a failure of one column can be easily circumvented by disabling the failed column and employing another column in its stead. Because a large area can be used for exposing the print medium, the light intensity that is utilized need not be high, and the detrimental effects of high light intensity on light modulators are thereby reduced. The data is digital, while the resulting image is near analog. Working with digital signals is normally easier than with analog, but the principles employed in my printer can be employed with equal ease in connection with analog signals.

Figure 2:
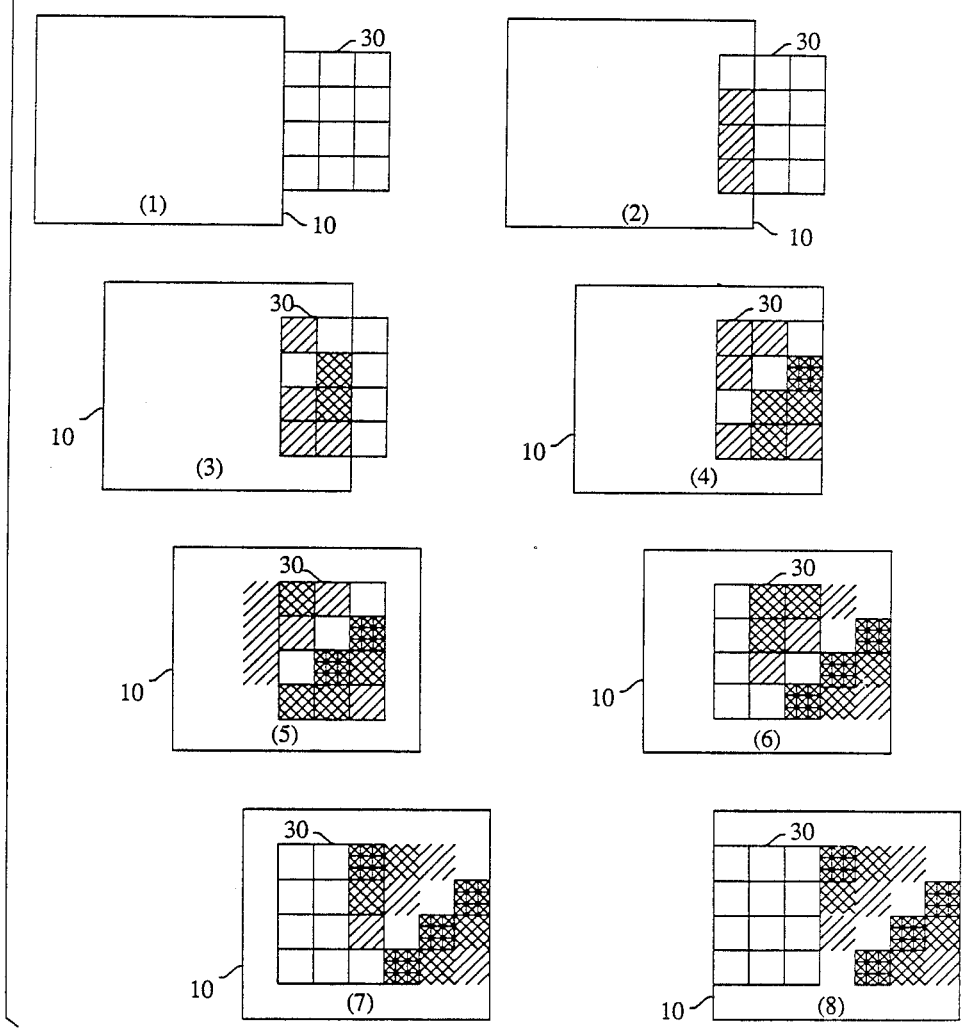
FIG. 2 presents a sequence of views that show the manner of achieving the exposure pattern of FIG. 1.

FIGS. 1 and 2 present an example that clarifies the above-outlined principles. In FIG. 1 there is shown a sheet of print medium 10 on which there is a square area 20 comprising 16 pixels (4 by 4). The pixels along the diagonal (rising to the right) are unexposed, and the remaining pixels are exposed to different degrees. Specifically in area 20, there are pixels with a single diagonal cross hatching, indicating a level 1 exposure, e.g., pixel 21; pixels with double diagonal cross hatching, indicating a level 2 exposure, e.g., pixel 22; and pixels with both a double diagonal and square cross hatching, indicating a level 3 exposure, e.g., pixel 23. Level 2 exposure can be achieved by exposing with twice as much light or by exposing for twice as long. A similar approach can be taken for all levels of exposure.

For ease in the following discussion which describes FIG. 2 in greater detail, square area 20 of FIG. 1 can be represented by a number array corresponding to the exposure intensities, to wit array:

3210
2103
1032
0321

As stated above, the print medium is exposed by moving it relative to an array of light sources. The relative movement is parallel to rows in the array of light sources. In FIG. 2, this is depicted by the eight views of print medium 10 and light source arrangement 30. Arrangement is shown with four rows and three columns. Exposure of a pixel is controlled by the number of light sources in the row of arrangement 30 that the pixel traverses which contribute light to the pixel. Since the pixels on print medium 10 will, at most, be exposed with a level 3 exposure, e.g., by exposing a pixel three times, the required number of light sources in each row of arrangement 30 need not exceed three; ergo the number of columns shown in FIG. 2. It will probably become clear from the following, but it may also help to explicitly state that in accordance with the principles of my invention the array of light sources requires some of "rows" in the direction of relative movement of the print medium relative to the array of light sources, but "columns" are not required. An array of rows and columns as depicted in FIG. 2 does, however, simplify some of the electronic signal management.

The operation depicted in FIG. 2 can best be understood by associating the above-created number array with the exposure positions on the print medium, and further associating the numbers with the columns in the array of light sources as the print medium reaches those columns. The latter association can be viewed in terms of a set of registers associated with each column of the light array, into which columns of the number array are loaded from the left. Numbers in the left column registers are transferred to registers in the column to the right, as the print medium moves to the right.

In accordance with my invention, each column register applies a different threshold to the numbers in the registers. In this manner, with proper selection of the thresholds each pixel is illuminated the proper number of times as it passes beneath the array. One approach for effecting this different threshold is to decrement the numbers as they are transferred from one set of column registers to the next set of column registers, and employ zero as the threshold. When a number in a register is greater than zero, the corresponding light source applies light to the pixel below it; otherwise it does not. Other approaches are, of course, possible. For example, the thresholds applied to the columns need not be in sequential order.

With that in mind, FIG. 2 can be easily analyzed. In view (1) of FIG. 2, the print medium is not under light sources 30. Therefore, none of the numbers are associated with any of the columns in arrangement 30. In view (2), the first column of pixels on medium 10 is under the left-most column of light sources 30 and, according to the approach described above, the leftmost column of 30 is provided with information concerning column 1 in the number array; that is:
0
3
2
1

Based on these numbers, the lower three light sources in the left-most column of arrangement 30 expose the pixels beneath them (since their values are greater than zero). In view (3), the first and second columns of pixels of medium 10 are under the center and the left-most columns of arrangement 30, respectively, and according to the approach outlined above, the left-most column of arrangement 30 is provided with information concerning column 2 in the number array, while the center column is provided with the numbers previously associated with the leftmost column of arrangement 30—but decremented by one (a zero does not get decremented). Thus, the numbers stored in the column registers:
10
02
31
20

Based on these numbers, the top one and the lower two light sources in the leftmost column of arrangement 30 expose the pixels beneath them, together with the middle two light sources in the center column of arrangement 30.

In view (4) of FIG. 2, all three columns of arrangement 30 are over medium 10. The control numbers associated with the columns are:
200
101
020
310 and in accordance with these numbers, the appropriate light sources in arrangement 30 expose the pixels beneath them.

Carrying through views (5) through (8) yields the final pattern as the print medium exits to the right of arrangement 30.

Figure 3:
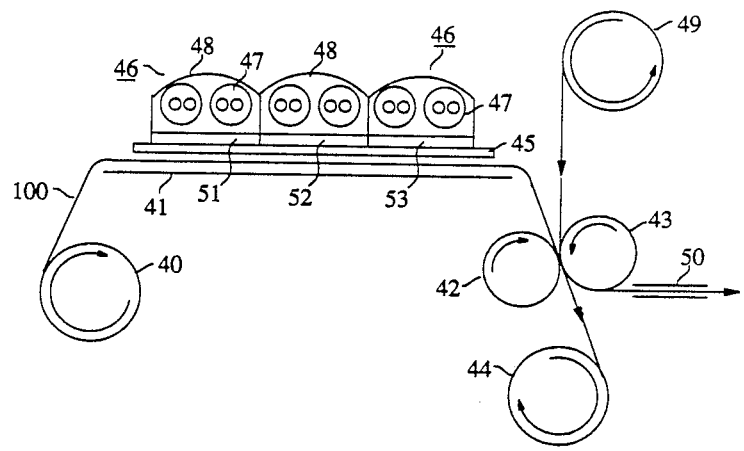
FIG. 3 illustrates one embodiment of a printer incorporating the principles of my invention and employing three florescent light sources.

A number of printer embodiments can easily be constructed that incorporate the principles of my invention. For illustrative purposes, FIG. 3 depicts one embodiment for the Mead microencapsulated "paper". In FIG. 3, the substrate carryig the microcapsules, in the form of a "paper" roll, is placed on paper supply reel 40. From reel 40 the "paper" (100) is passed over platen 41, then it is passed between pressure rollers 42 and 43, and lastly it is taken up by take-up reel 44. Passage of the microcapsule-laden substrate over platen 41 is arranged so that the mirocapsules are facing away from the platen.

Above platen 41 and the microencapsulated substrate there is a light modulator 45, and above modulator 45 there are three light sources 46 that comprise two florescent lamps 47 and a light reflector 48. Between the open end of each reflector 48 and modulator 45, a filter is provided for color separation, or narrowband phosphors may be employed. Filter 51 passes only the spectrum portion of light that activates the color yellow in the microcapsules, filter 52 passes only the spectrum portion of light that activates the color cyan in the microcapsules, and filter 53 passes only the spectrum portion of light that activates the color magenta in the microcapsules.

The printer of FIG. 3 also includes supply reel 49 that stores the color print paper onto which the image is transferred after the microcapsules are properly exposed. To that end, the color print paper is passed between pressure rollers 42 and 43 and arranged to mate with the microcapsules on the substrate. Following the pressure roller arrangement, the color print paper is passed through heater 50 and out of the printer.

In operation, the image is generated when the microencapsulated substrate is exposed to the three colors as it passes below modulator 45. The exposed substrate is mated with the color print paper at pressure rollers 42 and 43, and the microcapsules are ruptured by the pressure of the rollers. The chemicals released (dye precursers) are absorbed by the mated paper, which is then passed through heater 50, where the dye formation occurs and the image is fixed.

Modulator 45 performs the function of arrangement 30 in FIG. 2. Although arrangement 30 is described in terms of "light sources," FIG. 3 makes it clear that my invention is not restricted to active light emitter means, such as LEDs or a controlled laser beam. In the FIG. 3 embodiment, the printer employs a single light source for each color and a light modulator, or valve, which combine to form the "light sources". Modulator 45 may be constructed in a number of ways, but, currently, the most convenient approach is to employ a conventional active-matrix-addressed twisted-nematic liquid crystal array. Indeed, a liquid crystal (LC) array comprising 480 rows and 440 addressable cells per row can be purchased, for example, from Seiko-Epson.

Figure 4:
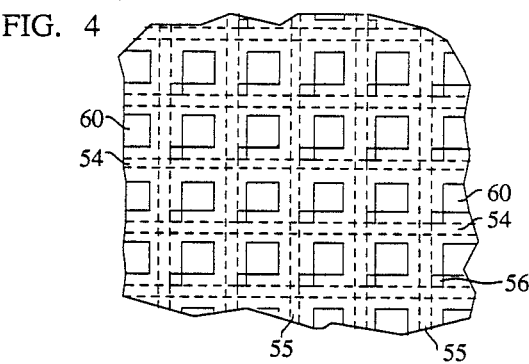
FIGS. 4-6 show different pixel patterns that can be used in the light modulator of the FIG. 3 printer.

Another design flexibility is found in the geometrics that the light valve may take, and the one selected may be a compromise between desired accuracy and desired low cost. FIG. 4 present a simple rectangular design. It comprises row address lines 54 and column address lines 55 that are positioned perpendicularly to the row address lines. At each intersection of the row and column address lines there is a transistor 56 that is activated when both the row and the column address lines are at the appropriate level. Each transistor 56 is connectde to an associated liquid display pixel element 60 which is caused to transmit light when the transistor is activated.

Figure 5:
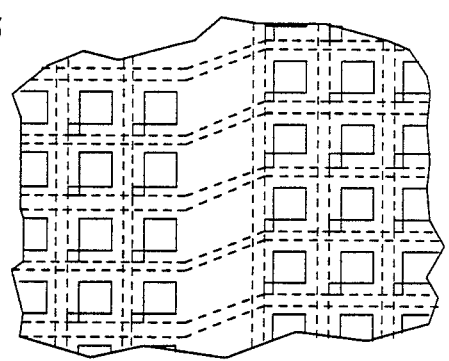

One of the problems with the FIG. 4 design is that the separation between elements 60, which allows the insertion of row address lines 54, causes the appearance of blank (unexposed) lines in the color print. Such an artifact is clearly undesirable. FIG. 5 presents only a slightly more complex design which avoids that problem by separating pixels 60 into two groups and shifting one of the groups with respect to the other group to align the pixels on one group with the address lines of the other group. This shift also doubles the linear resolution in the column's direction. When the pixels along a column are numbered (to assign addresses), the pixels in one group can assume the odd numbers and the pixels in the other group can assume the even numbers.

Figure 6:
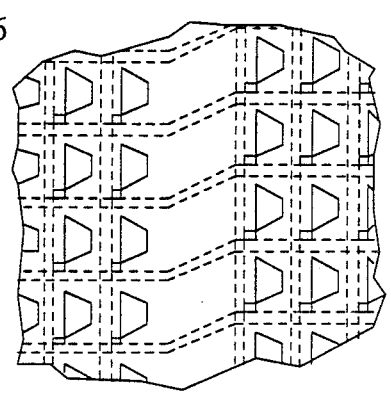

Although the arrangement of FIG. 5 results in complete coverage along th column direction, the delineation between one pixel and the next is rather abrupt. That, too, may create artifacts. FIG. 6 presents a design where pixels 60 are trapezoidal in shape and dimensioned so that the trapezoids in one group overlap the trapezoids in the other group. This melds the transitions between the odd and even pixels.

Figure 7:
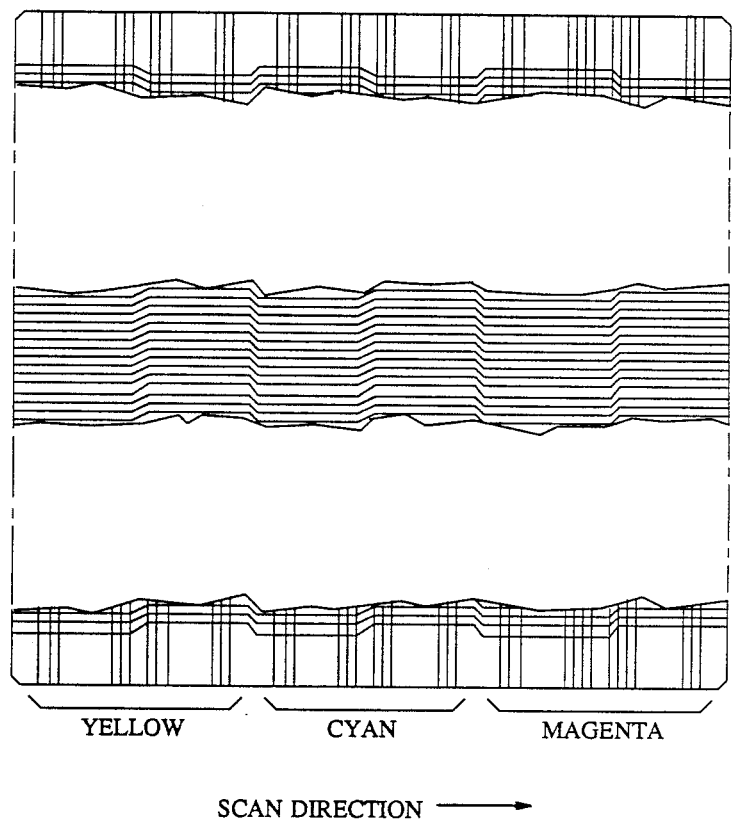
FIG. 7 presents an overall view of the address bus pattern in the light modulator of the FIG. 3 printer.

FIG. 7 depicts the modulator arrangement in a more macroscopic view, showing the odd and even groups and the three color groups, for a total of six segments, In one of my embodiments, I employ segments of 31 columns (permitting a dynamic range defined by 5 bits) and 240 cells per column. The clear cell areas of pixels 60 are 0.009 inches on a side (square) and are on 0.0188 inch centers.

Although separate color groupings are shown in FIG. 7, it should be understood that different arrangements can easily be employed with equally beneficial results. For example, the columns of FIG. 7 can be arranged in sets of three, where each set contains a column for each of the three colors. The columns within each set can also be arranged in different order to result, effectively, in pixel interleaving. Each such different arrangement, of course, requires different corresponding signal drive arrangements.

The considerations discussed above in connection with FIGS. 4–6 relate only to one of the two orthogonal directions that make up the final color prints; that is, the direction perpendicular to the relative movement of the print medium. As for the direction along the relative movement of the print medium, the important consideration is not only the shape and position of pixels 60 but also the nature of the relative movement; for the two are highly interelated. An initial consideration which does not affect the nature of the print is whether the print medium should be moving relative to the printer body while the modulator remain stationary, or whether the light modulator should be moving and the print medium remain stationary. The printer of FIG. 3 moves the print medium, and there are a number of considerations (e.g., mass, and complexity) that suggest the use of this approach. Another consideration that does affect the color print is whether the movement should be continuous, or stepped. Continuous movement is simpler, is less expensive to achieve, and the equipment is generally more reliable. On the other hand, stepped movement offers greater control in terms of pixel definition, because continuous movement necessarily means a blurring of pixel boundaries in the direction of movement. From the above brief discussion of artifacts it is established that some blurring is desirable and, therefore, the only question is whether the blurring due to a continuous movement is acceptable. If it is acceptable, or if it can be made acceptable by adjusting the speed of movement relative to the switching time of the light modulator, then a continuous movement is preferable.

An additional important consideration is the transmission of light by the modulator. This consideration relates to the degree of transmission at the wavelengths required by the print medium, to the speed of "turn on" and "turn off" by pixels 60, to the degree that the light provided by the filters (51, 52, and 53) is uniform and of equal intensity, to the degree that the light applied to modulator 45 is collimated, and to the distance between modulator 45 and the exposed print medium. All of these consideration are well understood by skilled artisans, and there are many well known design options which can be applied to achieve the desired results. In FIG. 3, for example, to improve the uniformity of light, each of the three color arrangements has two florescent lamp sources 47 and a reflector 48. To reduce the effects of light dispersion, the modulator is shown in very close proximity of the print medium.

Figure 8:
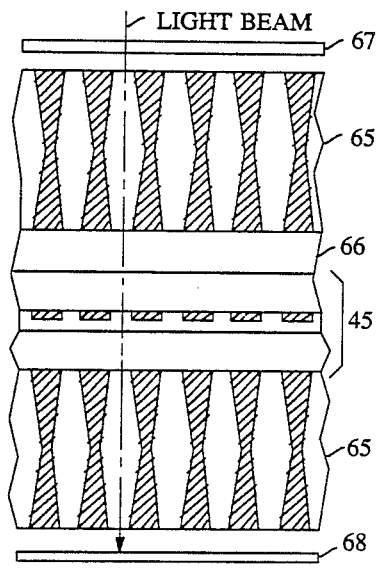
FIG. 8 depicts on approach for collimating the light passing through the light modulator of the FIG. 3 printer.

To collimate the light emanating from sources 47 and reflector 48, a two-dimensional collimator array can be employed in combination with the LC array. FIG. 8 illustrates an arrangement with two layers of such collimators. In FIG. 8 there are shown two thick aperture arrays 65, a polarizer 66, thin transparent film 67, an analyzer 68, and the active matrix addressed liquid crystal modulator 45. The aperature arrays form a collimator array which defines the acceptance angle for each individual pixel, defines the active pixel area and prevents cross talk between neighboring pixels. They can be formed by chemically machining a Corning Fotoceram ® plate from two sides. The etched holes have rough surfaces which diffusely scatter light. For the collimation to work effectively in the near-contact printing system of FIG. 3, it is essential that scattered light be highly absorbed in the light valve. The reflection coefficient for Fotoceram varies from 0.25 in the red range of the light spectrum to about 0.05 in the blue range of the light spectrum, and off-axis multiply scattered rays are highly attenuated.

Placing polarizer 66 between the upper collimator array 65 and modulator 45 increases the absorption for any light reflected from the metallic address busses in the liquid crystal modulator and allows a reflective coating to be placed on the upper surface of the array to help reduce light loss from the lamp housing. To keep dust particles out of the holes in the upper array 65, a thin transparent cover sheet 67 is included. For the lower collimator array 65, analyzer 68 provides the dust barrier function.

Proper shading of cover sheet 67 can, by the way, also help to achieve a uniform light intensity.

Before proceeding with a description of the electronics associated with my color printer, a number of the more practical considerations associated with the mechanical design may be reviewed.

With respect to the Mead microencapsulated print medium, it is probably useful to include means for reversing the movement of the print medium, so that the amount of wasted "paper" is kept to a minimum. The mechanism for that is not shown in FIG. 3, since it is perfectly conventional.

The system shown in FIG. 3 is adapted for the Mead print medium which requires a transfer sheet. For the 3 M dry silver paper, on the other hand, the pressure rollers, the transfer sheet roll and the take-up roll are elimated, and the exposed sheet may be fed directly into the processing heater. The characteristics of 3 M dry silver paper and standard photograhphic materials are effected less by temperature and humidity than the Mead "paper" and the environmental control requirements are less stringent. The principle concern with 3M materials is related to the effects of temperature on the shelf like of the paper. To prevent excessively rapid deterioration of the paper in the printer, the internal temperature should be kept below 30° C. That may require fans.

One additional concern that, in effect, has to do with light uniformity relates to the fact that the scan rates for all three colors are identical. Consequently, the intensities of the lamps assigned to each of the colors must be monitored and controlled to obtain the proper exposure levels, which in current technology means that each lamp must have an independent light sensor and control circuitry. To maximize utilization of the available light, the bottom surface of the lamps in the FIG. 3 printer is very close to sheet 67, and to reduce complexity a mechanical shutter is not included to limit the exposure of the liquid crystal to degrading ultraviolet light. Therefore, some means may need to be included to turn on the lamps immediately before the scan and have them brought up to a controllable level before the beginning of the exposure, and turned off at some predetermined time after the scan.

The light profile across the array in the scan direction will be determined by both the lamp spacing from the upper collimator and the reflector design. Practically, however, it is very difficult to obtain a uniform light intensity profile, but it is less difficult to let it be symmetric about the center of each color segment. This nonuniformity can easily be compensated electronically, through modification of the intensity values that are applied to the threshold electronics which are described below. Additionally, both the Mead "paper" and 3M dry silver tend to have gammas greater than one. The nonlinearity in the light profile could be exploited to implement the gamma correction in a fashion which would not require a nonlinear quantizer, or the sacrificing of available intensity levels.

Lastly, with respect to the more conventional aspects of my printer, fluorescent lamps must be driven from AC sources if reasonable lifetimes are to be obtained. It is also economically advantageous to drive them from the 120 volt 60 Hz AC line. If the basic exposure durations of pixels 60 have a frequency that is not a sub-multiple of 60 Hz, beat frequencies result which produce vertical light and dark bands in the image. These can be eliminated by making the scan period an integral multiple of the power period; but even if this precaution is not taken, each pixel is exposed for up to 31 exposure cycles and, consequently, the beat amplitude is a small fraction of the lowest exposure level.

The operating speed of my printer is related to the light intensity that is available, to the sensitivity of the photo-sensitive medium, to the number of pixels that must be exposed sequentially, to the number of lines on the scan windows which determines the effective aperture of the system, and to the switching time of the LCDs. The latter factor is the one that is most directly under the designer's control.

The FIG. 7 modulator comprises, in effect, a square array with rows and columns. In accordance with the operation mode described above, all of the columns operate in parallel, and because of the addressing nature of the row/column arrangement, this means that either the pixels in each column are handled sequentially while the pixels in each row are controlled in parallel, or vice-versa. To increase parallelism, it is best to select the mode that enables parallel control of as many pixels as possible. On the other hand, selection of either option may be dictated by the aspect ratio of the desired product, the aspect ratio of modulator 45, and the manner in which the data is provided. In the odd/even pixel arrangement described above, the two rows corresponding to an odd/even pair are really one row of pixels that can be controlled in parallel, if each group (odd/even) of pixels has its own column control line. A sequential treatment of the pixels in a columns may cause a problem in a printer employing a continuous movement of the print medium, because of the generated skew. A sequential treatment of the columns rather than the rows may avoid the skew problem entirely.

Figure 9:
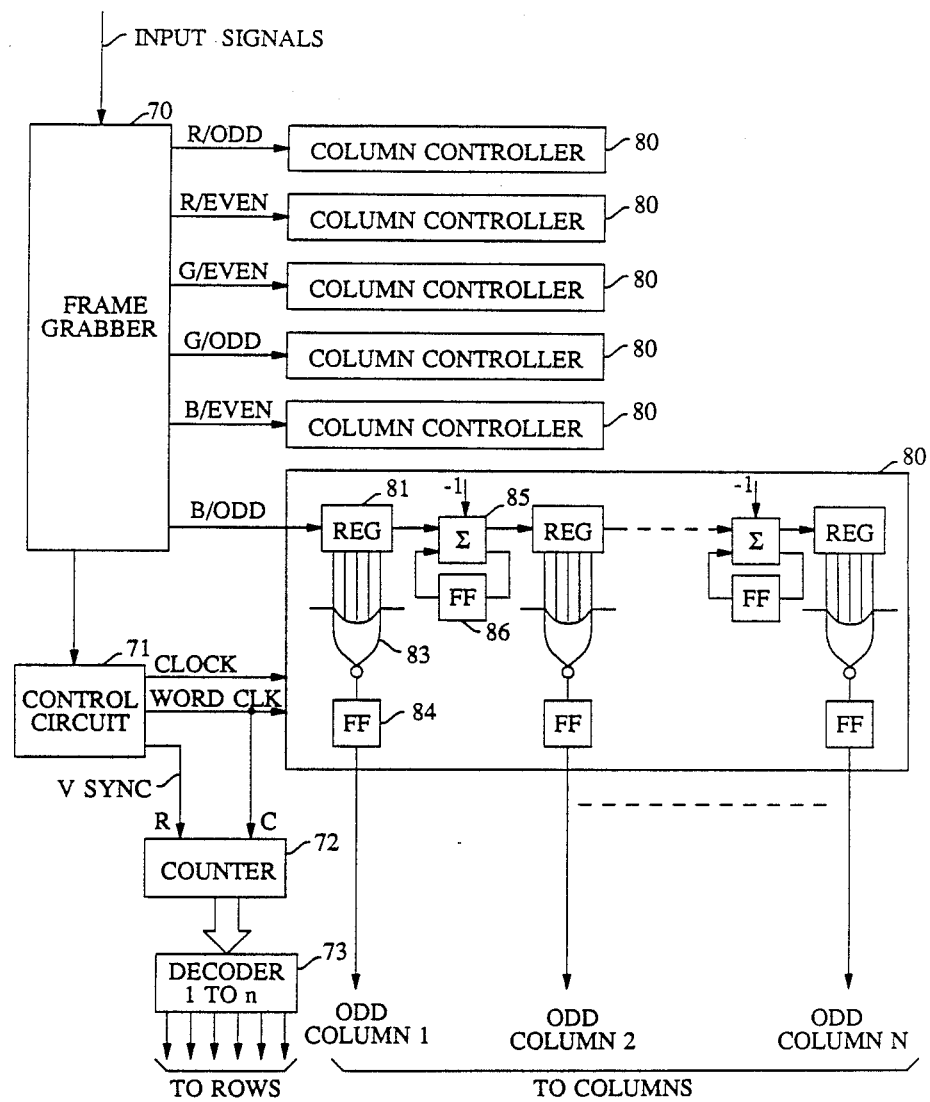
FIG. 9 presents a schematic diagram depicting some of the circuitry necessary for controlling the modulator of FIG. 3.

FIG. 9 present a schematic diagram of a portion of the electronic circuitry required to control one color segment of modulator 45. The portions not shown are either identical to the ones shown or totally conventional. The simplicity of the circuit is "underwhelming." For signals appearing from a television-like source, FIG. 9 provides a frame grabber 70. Its function is to capture one frame of the image, and its design is completely conventional. Control circuit 71 interacts with grabber 70 and causes it to output its pixel information on the red (R), green (G), and blue (B) busses simultaneously. Specifically, grabber 70 provides a pair of R, G, and B busses: one for even pixels and one for odd pixels. Control circuit 71 also provides a basic clock signal, and a word clock signal to circuits 80 (shown only once in FIG. 9) which are synchronized with the R, G, and B buss signals. Thus, the picture information of each bus is delivered to a circuit 80 by grabber 70 substantially in the same manner as it was entered; to wit, a pixel at a time, scanning one row at a time. The only differene lies in the use of an even track and an odd track of pixels. The word clock signal is also applied to a clock input of counter 72, while a vertical sync (V sync) signal from control 71 is used to reset counter 72. The output of counter 72 is applied to a 1-to-N decoder 73 which develops the activation signals for the rows of modulator 45.

In each circuit 80 the input data signals (of one of the colors) are applied to shift register 81 (column register in the above description) whose length is adapted to hold the information of all the pixels in a picture row. This data is also the information of one column of my printer's modulator 45 column; where a column is defined to include only the odd or the even pixels. The signal intensity of each pixel is defined by a 5 bit word, but for convenience a sign bit is also provided to permit easier manipulation of the decrementing function between column registers, as described above. Circuit 80 comprises a serial chain of registers 81 (interconnected via decrement circuits) that equal in number to half the number of columns in each color segment of modulator 45. Thus, the output of register 81 which receives its input signals from grabber 81 is connected via a decrement circuit to a subsequent register 81. The decrement circuit comprises a simple serial adder 85 in combination with carry flip-flop 86 and a control port which applies the signal corresponding to −1. In operation, the values exiting one register 81 are decremented by 1 before being inserted into the next register 81.

The six initial stages of each register 81 provide their contents to a test circuit 82 which comprises a NOR gate 83 which develops a "1" output only when all inputs are "0" and a flip-flop 84 which captures the state of gate 83 with the word clock signal. The output signal of flip-flop 84 associated with the first register 81 is applied to the first column (even or odd, as appropriate), the output signal of the next flip-flop 84 in the chain is applied to the second column, etc.

Figure 10:
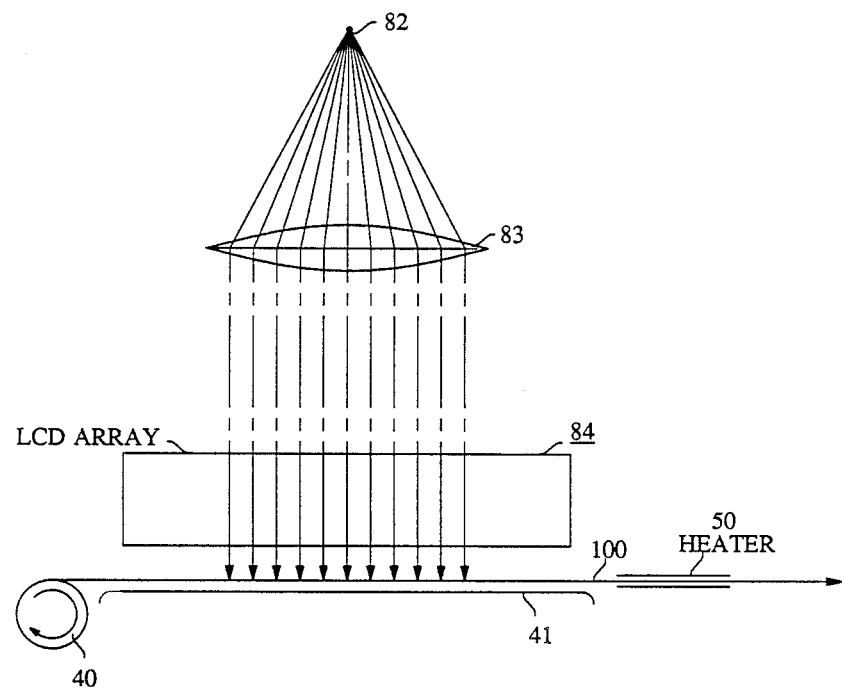
FIG. 10 illustrates a printer embodiment that employs a single light source.

The above description of FIG. 4 addressed itself to the use of the MEAD paper and to a compact embodiment that employs florescent light sources. FIG. 10 depicts an arrangement employing a conventional incandescent light source and collimation optics. Additionally, for purposes of illustration, FIG. 10 is shown to employ the 3M dry silver paper.

In FIG. 10, light source 82 represents a "point source". The "point source" may be realized conventionally to whatever desired degree of accuracy with a projection lamp, a mask, and associated optics. The output of source 82 is collimated with lens 83, which may be a standard lens or a Freznel lens. The collimated light output of lens 83 is applied to LCD assembly 84. Assembly 84 is similar to LCD assembly of FIG. 8 in that it contains elements 66, 45, and 68. It differs in that it does not require collimators 65 and cover 67 but is does require color separation filters (51, 52 and 53) and some means for preventing the light from reaching the paper at non-active areas of the LCD array (mask). The printer of FIG. 10 also includes paper supply reel and heater 50, but, unlike the printer of FIG. 4, there is no need for a transfer sheet supply roller, pressure rollers, or a take-up roller.

I claim:

1. Apparatus for applying an image onto a print medium comprising: a two dimensional array of exposure-producing elements for developing exposure-producing excitation that is applied to said print medium;
    means for moving said print medium in one dimension relative to said array and along said surface; and
    a controller responsive to applied input signals representative of said image for determining the effect of said exposure- producing elements on said print medium.

2. The apparatus of claim 1 wherein said exposure-producing elements form a two-dimensional array that includes rows which are aligned with the movement of said print medium along said surface.

3. The apparatus of claim 1 wherein each of said exposure-producing elements controllably contributes either zero or a preselected non-zero quantum of exposure-producing energy to said print medium.

4. The apparatus of claim 1 wherein said exposure-producing elements comprises a number of groups, with each group causing a different effect on said medium.

5. The apparatus of claim 4 wherein each group causes a different color to be developed at said print medium.

6. The apparatus of claim 1 wherein said exposure producing elements are luminaries.

7. The apparatus of claim 6 wherein said luminaries have a trapezoidal shape.

8. The apparatus of claim 6 wherein said luminaries are light valves.

9. The apparatus of claim 6 wherein said luminaries are light sources.

10. The apparatus of claim 6 wherein said luminaries are light modulators.

11. The apparatus of claim 10 wherein said controller comprises a light source for applying light to said array of luminaries.

12. The apparatus of claim 11 wherein said controller further comprises means for collimating the light output of said light source.

13. The apparatus of claim 1 wherein said array comprises rows of exposure-producing elements.

14. The apparatus of claim 13 wherein said means for moving effects a movement of said print medium, relative to said array, in parallel to said rows.

15. The apparatus of claim 13 wherein said array further comprises columns, with some columns connected to some rows, and other columns connected to other rows.

16. The apparatus of claim 13 wherein said controller comprises means for applying input signals of different colors to different columns.

17. The apparatus of claim 16 wherein said controller further comprises means for applying a common effective threshold for changing the operational state of said exposure-producing elements in a column, and different effective thresholds for different columns.

18. The apparatus of claim 17 further comprising means for disabling selected columns.

19. In an arrangement comprising a print medium and an array of exposure-producing elements have rows of elements, where each of said exposure-producing elements creates a visible contrast in said print medium when said print medium is placed in responsive physical coupling with said element and said element is activated, a method for developing prints on said print medium comprising:
    a step of moving said print medium in responsive coupling with said array and in parallel with said rows;
    a step of repeatedly identifying, based on applied input signals, those of said exposure-producing elements in said rows that must be activated; and
    activating appropriate ones of said exposure-producing elements, based on said step of identifying, in the course of said step of moving.

* * * * *